United States Patent
Rakshit et al.

(10) Patent No.: US 12,223,575 B2
(45) Date of Patent: Feb. 11, 2025

(54) AR-BASED VISUALIZATION OF ACCIDENTAL SITUATION IN MULTI-MACHINE ENVIRONMENT

(71) Applicant: INTERNATIONAL BUSINESS MACHINES CORPORATION, Armonk, NY (US)

(72) Inventors: Sarbajit K. Rakshit, Kolkata (IN); Saraswathi Sailaja Perumalla, Visakhapatnam (IN); Ashwini Padubidri Chandrase, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 18/048,559

(22) Filed: Oct. 21, 2022

(65) Prior Publication Data
US 2024/0135614 A1  Apr. 25, 2024
US 2024/0233226 A9  Jul. 11, 2024

(51) Int. Cl.
*G06T 13/00* (2011.01)
*G06T 19/00* (2011.01)

(52) U.S. Cl.
CPC ............ *G06T 13/00* (2013.01); *G06T 19/006* (2013.01); *G06T 2215/16* (2013.01)

(58) Field of Classification Search
CPC .... G06T 13/00; G06T 19/006; G06T 2215/16
See application file for complete search history.

(56) References Cited

U.S. PATENT DOCUMENTS

| | | | |
|---|---|---|---|
| 2013/0009993 A1* | 1/2013 | Horseman | G16H 40/63 345/633 |
| 2019/0147655 A1* | 5/2019 | Galera | G06T 15/20 345/419 |

(Continued)

OTHER PUBLICATIONS

Kim, GY et al. (Sep. 17, 2022). (Human Digital Twin System for Operator Safety and Work Management. In: Kim, D.Y., von Cieminski, G., Romero, D. (eds) Advances in Production Management Systems. Smart Manufacturing and Logistics Systems: Turning Ideas into Action. APMS 2022. (Year: 2022).*

(Continued)

*Primary Examiner* — Yu Chen
(74) *Attorney, Agent, or Firm* — Robert R. Aragona

(57) ABSTRACT

An embodiment for augmented reality (AR)-based visualization of an accidental situation in a multi-machine environment is provided. The embodiment may include receiving real-time and historical data relating to an activity. The embodiment may also include identifying a context of the activity and at least one property of one or more objects associated with the activity. The embodiment may further include identifying one or more items of safety equipment used by a user. The embodiment may also include assigning a compatibility score to the user. The embodiment may further include in response to determining the compatibility score is not adequate, executing a digital twin simulation of an avatar of the user. The embodiment may also include creating a visual animation of a resultant state of the avatar of the user consistent with the executed digital twin simulation. The embodiment may further include displaying the visual animation to the user.

20 Claims, 4 Drawing Sheets

(56) References Cited

U.S. PATENT DOCUMENTS

| | | | | |
|---|---|---|---|---|
| 2020/0388177 | A1* | 12/2020 | Recker | G06F 3/011 |
| 2021/0216773 | A1* | 7/2021 | Bohannon | G06V 20/20 |
| 2021/0343182 | A1 | 11/2021 | Lu | |
| 2021/0372561 | A1* | 12/2021 | Swift | A62B 99/00 |
| 2023/0186201 | A1* | 6/2023 | Cella | G05B 19/41885 705/7.17 |
| 2023/0343040 | A1* | 10/2023 | Donoghue | G06F 18/24137 |

OTHER PUBLICATIONS

Disclosed Anonymously, "Method and System for Accident Propagation Path Visualization to Identify Accident Location on Any Industrial Floor", IP.com, IPCOM000267242D, Oct. 11, 2021, 3 Pages.

Disclosed Anonymously, "Virtual Reality System That Uses Digital Twins to Visualize an Individual's Level of Adaptability", IP.com, IPCOM000261908D, Apr. 16, 2020, 3 Pages. https://priorart.ip.com/IPCOM/000261908.

Eversden, "Into the Military Metaverse: An empty buzzword or a virtual resource for the Pentagon?", Breaking Defense.com, Apr. 12, 2022, 15 Pages. https://breakingdefense.com/2022/04/into-the-military-metaverse-an-empty-buzzword-or-a-virtual-resource-for-the-pentagon/.

Lasserre, "4 use cases for virtual reality in the military and defense industry", Techviz, Feb. 10, 2021, 10 pages. https://blog.techviz.net/4-use-cases-for-virtual-reality-in-the-military-and-defense-industry.

Nake, et al., "Visualizing Quantified Self Data Using Avatars", ACHI 2016: The Ninth International Conference on Advances in Computer-Human Interactions, 2016, 10 Pages. https://www.thinkmind.org/articles/achi_2016_3_30_20074.pdf.

Napolitano, et al., "Using Avatars to Model Weight Loss Behaviors: Participant Attitudes and Technology Development", Journal of Diabetes Science and Technology, vol. 7, Issue 4, Jul. 2013, 9 Pages.

Sennersten, "Model-based Simulation Training Supporting Military Operational Processes", Blekinge Institute of Technology, Jan. 2010, 212 Pages. https://www.researchgate.net/publication/46119290_Model-based_Simulation_Training_Supporting_Military_Operational_Processes.

Strivr, "Take your team's training to the next level", Strivr.com, [Accessed on Sep. 15, 2022], 12 pages. Retrieved from Internet: https://www.strivr.com/solutions/industries/sports/.

North Atlantic Treaty Organisation, "Virtual Reality: State of Military Research and Applications in Member Countries", Research and Technology Organisation, Feb. 2003, 154 Pages. https://apps.dtic.mil/sti/pdfs/ADA411978.pdf.

* cited by examiner

AR-BASED VISUALIZATION OF ACCIDENTAL SITUATION IN MULTI-MACHINE ENVIRONMENT

BACKGROUND

The present invention relates generally to the field of computing, and more particularly to a system for augmented reality (AR)-based visualization of an accidental situation in a multi-machine environment.

Machines, such as heavy machinery on a factory floor, are currently used to perform a wide variety of activities in an industrial environment. Some of these activities require the intervention of a human worker to complete. These machines have differing capabilities in the industrial environment, and therefore different properties. The workers interacting with any machine may be wearing safety equipment to minimize the risk of serious injury. For example, the workers may be wearing safety goggles to avoid debris from entering the eye and/or the worker may be wearing gloves to prevent cuts to the hand. Furthermore, the workers may be required to maintain a constant level of awareness of their movements when performing any activity.

SUMMARY

According to one embodiment, a method, computer system, and computer program product for augmented reality (AR)-based visualization of an accidental situation in a multi-machine environment is provided. The embodiment may include receiving real-time and historical data relating to an activity in a multi-machine environment. The embodiment may also include identifying a context of the activity and at least one property of one or more objects associated with the activity based on the real-time data. The embodiment may further include identifying one or more items of safety equipment used by a user in the multi-machine environment. The embodiment may also include assigning a compatibility score to the user based on the identified one or more items of safety equipment. The embodiment may further include in response to determining the compatibility score is not adequate, executing a digital twin simulation of an avatar of the user with the identified one or more items of safety equipment based on a predicted action of the user and the historical data. The embodiment may also include creating a visual animation of a resultant state of the avatar of the user consistent with the executed digital twin simulation. The embodiment may further include displaying the visual animation to the user via an AR device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
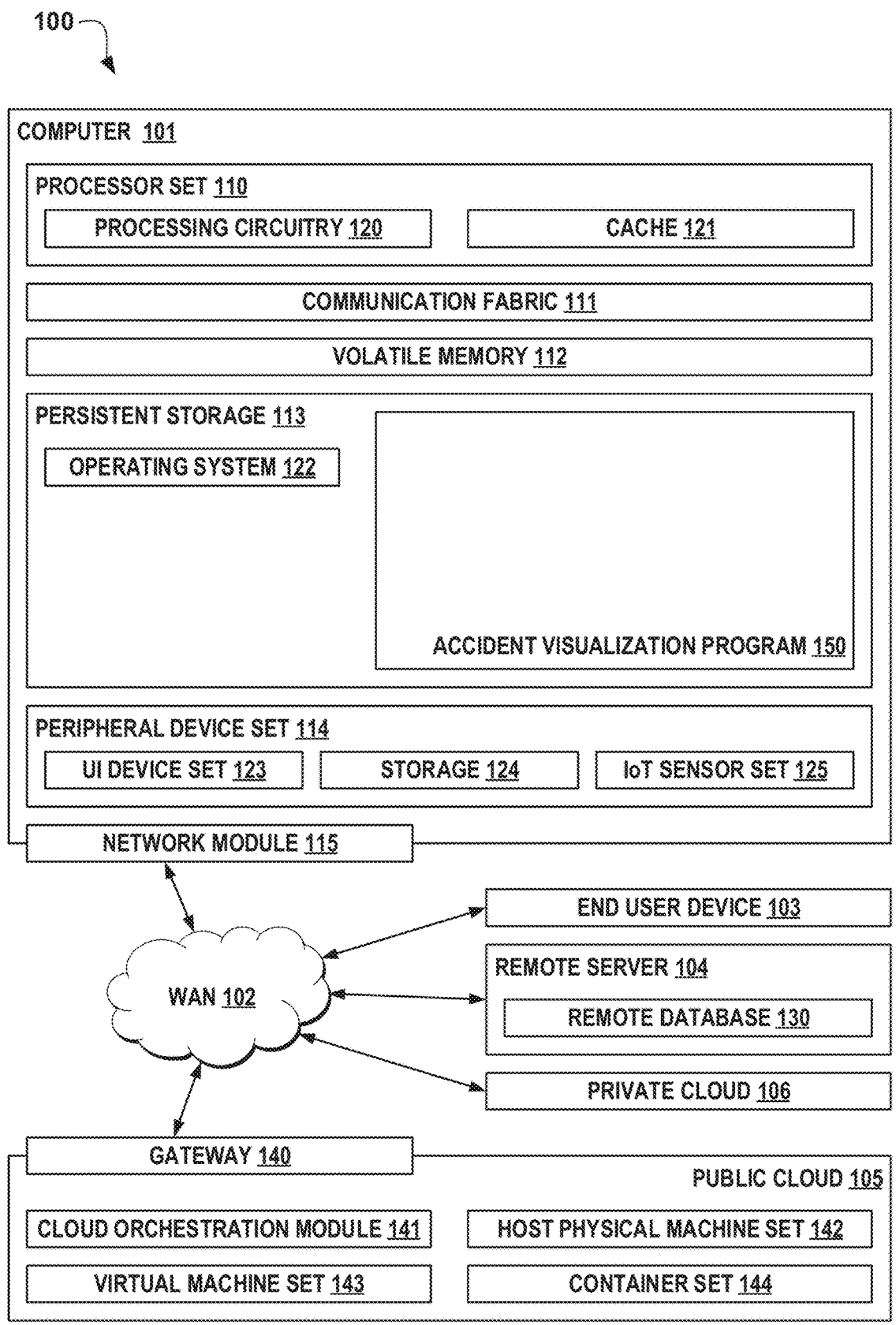
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for augmented reality (AR)-based visualization of an accidental situation in a multi-machine environment. The following described exemplary embodiments provide a system, method, and program product to, among other things, determine whether a compatibility score of a user is adequate to perform a predicted action without an accident and, accordingly, display a visual animation of a resultant state of an avatar of the user to the user via an AR device. Therefore, the present embodiment has the capacity to improve industrial machine technology by dynamically performing digital twin simulations to proactively protect a user from serious injury in any multi-machine environment.

As previously described, machines, such as heavy machinery on a factory floor, are currently used to perform a wide variety of activities in an industrial environment. Some of these activities require the intervention of a human worker to complete. These machines have differing capabilities in the industrial environment, and therefore different properties. The workers interacting with any machine may be wearing safety equipment to minimize the risk of serious injury. For example, the workers may be wearing safety goggles to avoid debris from entering the eye and/or the worker may be wearing gloves to prevent cuts to the hand. Furthermore, the workers may be required to maintain a constant level of awareness of their movements when performing any activity. When a user (i.e., the worker) is performing an activity, the user may not have adequate safety equipment to carry out the activity safely. This problem is typically addressed by alerting the user of an unsafe condition in the workplace. However, alerting the user is static and fails to actively display to the user the potential consequences of performing any activity with the current safety equipment being used.

It may therefore be imperative to have a system in place to proactively display to a user the potential consequences of performing any activity with the current safety equipment being used. Thus, embodiments of the present invention may provide advantages including, but not limited to, dynamically performing digital twin simulations to proactively protect a user from serious injury in any multi-machine environment, preemptively preventing accidents in the multi-machine environment, and informing the user how to adequately update their safety equipment. The present invention does not require that all advantages need to be incorporated into every embodiment of the invention.

According to at least one embodiment, in a multi-machine environment, real-time and historical data relating to an activity may be received in order to identify a context of the activity and at least one property of one or more objects associated with the activity based on the real-time data. Upon identifying the context and the at least one property, one or more items of safety equipment used by a user in the multi-machine environment may be identified so that a compatibility score may be assigned to the user based on the identified one or more items of safety equipment. In response to determining the compatibility score is not adequate, a digital twin simulation of an avatar of the user may be executed with the identified one or more items of safety equipment based on a predicted action of the user and the historical data such that a visual animation of a resultant state of the avatar of the user may be created consistent with the executed digital twin simulation. According to at least one embodiment, the predicted action of the user may be a mobility direction of the user. According to at least one other embodiment, the predicted action of the user may be an interaction of the user with the one or more objects. Then, the visual animation may be displayed to the user via an AR device. Upon displaying the visual animation, a required compatibility score for the user to perform the predicted action without an accident may be identified based on the historical data in order to recommend one or more updates to the one or more items of safety equipment used by the user based on the required compatibility score.

The present invention may be a system, a method, and/or a computer program product at any possible technical detail level of integration. The computer program product may include a computer readable storage medium (or media) having computer readable program instructions thereon for causing a processor to carry out aspects of the present invention.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine whether a compatibility score of a user is adequate to perform a predicted action without an accident and, accordingly, display a visual animation of a resultant state of an avatar of the user to the user via an AR device.

Referring to FIG. 1, an exemplary computing environment 100 is depicted, according to at least one embodiment. Computing environment 100 contains an example of an environment for the execution of at least some of the computer code involved in performing the inventive methods, such as an accident visualization program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a camera, a machine, a robotic device, and/or any other device for performing labor related tasks.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the accident visualization program 150 may be a program capable of receiving real-time and historical data relating to an activity in a multi-machine environment, determining whether a compatibility score of a user is adequate to perform a predicted action without an accident, displaying a visual animation of a resultant state of an avatar of the user to the user via an AR device, dynamically performing digital twin simulations to proactively protect the user from serious injury in any multi-machine environment, preemptively preventing accidents in the multi-machine environment, and informing the user how to adequately update their safety equipment. Furthermore, notwithstanding depiction in computer 101, the accident visualization program 150 may be stored in and/or executed by, individually or in any combination, end user device 103, remote server 104, public cloud 105, and private cloud 106. The accident visualization method is explained in further detail below with respect to FIGS. 2A and 2B.

Figure 2A:
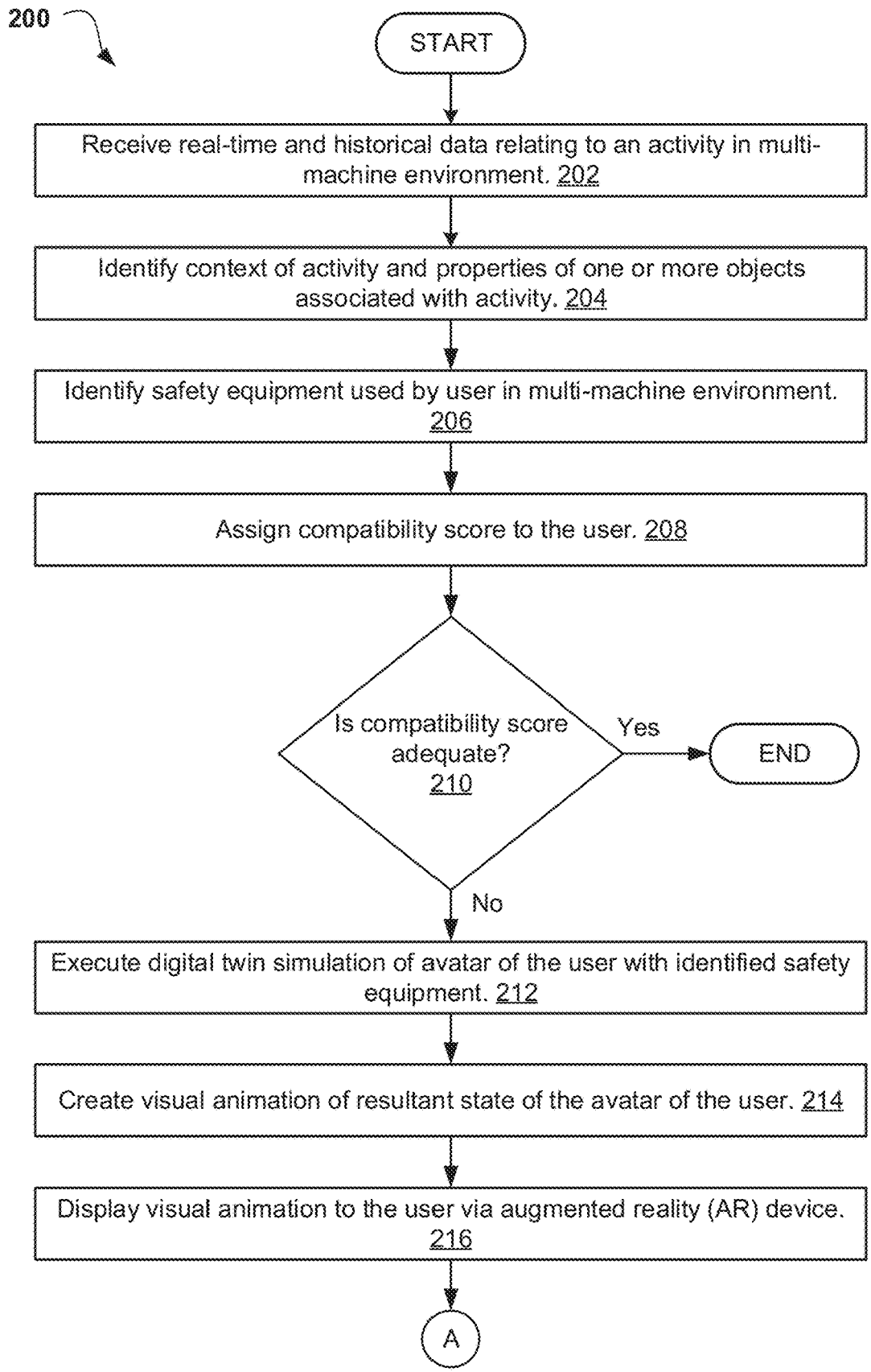
FIGS. 2A and 2B illustrate an operational flowchart for augmented reality (AR)-based visualization of an accidental situation in a multi-machine environment in an AR accidental situation visualization process according to at least one embodiment.
Figure 2B:
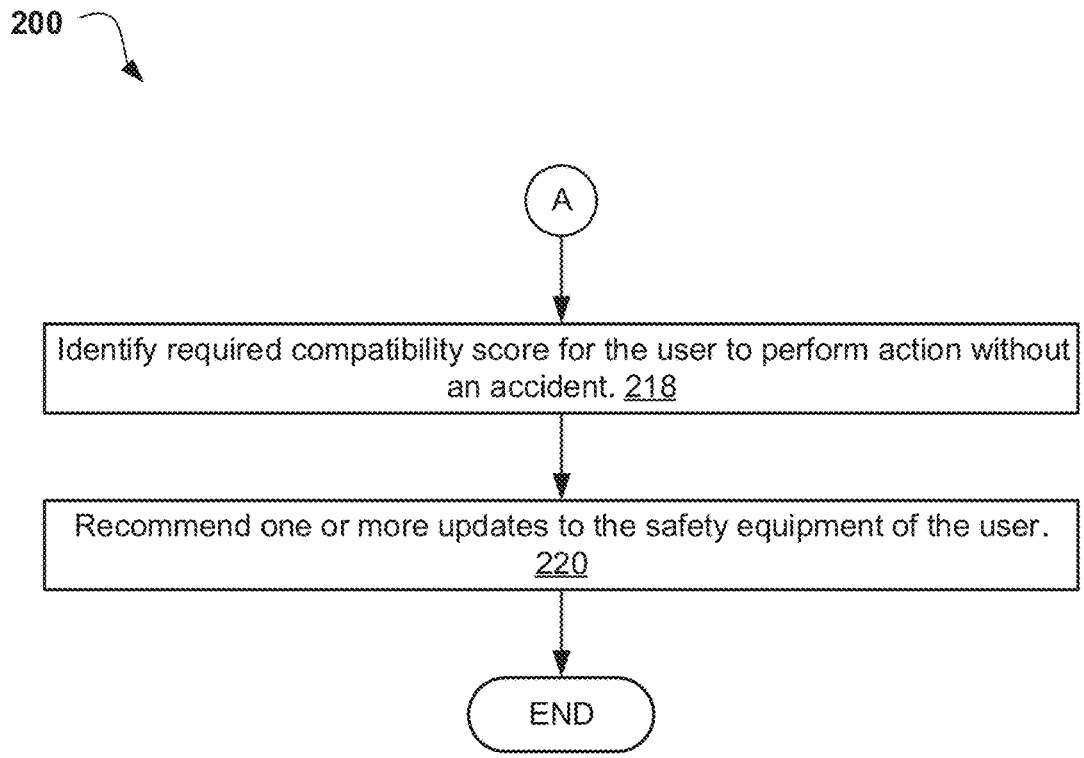

Referring now to FIGS. 2A and 2B, an operational flowchart for AR-based visualization of an accidental situation in a multi-machine environment in an AR accidental situation visualization process 200 is depicted according to at least one embodiment. At 202, the accident visualization program 150 receives the real-time and historical data relating to the activity in the multi-machine environment.

The real-time data relating to the activity may include the type of activity to be performed in the multi-machine environment. Examples of an activity may include, but are not limited to, assembling objects in a manufacturing facility, and transporting objects from one location to another, (e.g., moving a product from an assembly line to a shipping area). The real-time data relating to the activity may also include one or more objects associated with the activity. Examples of the object may include, but are not limited to, an automobile, a device on an assembly line, construction materials, a machine, and/or a cutting tool. The real-time data relating to the activity may be received from a video feed of the multi-machine environment and/or IoT sensor set 125, described in further detail below with respect to step 204. For example, the real-time data from IoT sensor set 125 may include a temperature reading of the machine.

The historical data relating to the activity may include historical accidents in the multi-machine environment as well as one or more factors present when the historical accidents occurred. The historical accidents and the one or more factors may be contained in a knowledge corpus, which may process this information and associate certain factors with particular historical accidents, described in further detail below with respect to step 210.

Then, at 204, the accident visualization program 150 identifies the context of the activity and the at least one property of the one or more objects associated with the activity. The context and the at least one property are identified based on the real-time data. As described above with respect to step 202, the real-time data relating to the activity may be received from a video feed of the multi-machine environment and/or IoT sensor set 125.

The context of the activity may be identified from the video feed and/or IoT sensor set 125. Examples of the context of the activity include, but are not limited to, conditions on the floor (e.g., a wet or slippery floor), conditions in the air (e.g., the presence of debris or dust particles), and/or an overall air temperature in the multi-machine environment. For example, the camera may identify that water and/or oil has accumulated on the floor. In another example, the thermometer may detect the overall air temperature to be 85° F.

The at least one property of the one or more objects associated with the activity may also be identified from the video feed and/or IoT sensor set 125. According to at least one embodiment, the one or more objects themselves may be identified by the accident visualization program 150 by performing visual object recognition on the one or more objects. For example, the accident visualization program 150 may perform visual object recognition on the cutting tool to identify the cutting tool as a knife. According to at least one other embodiment, the one or more objects themselves may be identified by the accident visualization program 150 based on the types of sensors in the IoT sensor set 125 associated with the object. For example, an object equipped with a thermometer, flow rate sensors, and energy detection sensors may be identified as a generator.

In either embodiment, the at least one property of the one or more objects may be derived from the objects themselves. Continuing the example above where the object is the knife, at least one property that is identified may be that the knife is sharp. Continuing the example above where the object is the generator, at least one property that is identified may be that the generator is hot. It may be appreciated that the examples described above are not intended to be limiting, and that in embodiments of the present invention the context of the activity and properties of the objects may be different.

Next, at 206, the accident visualization program 150 identifies the one or more items of safety equipment used by the user in the multi-machine environment. Examples of the items of safety equipment include, but are not limited to, a helmet, gloves, goggles, a vest, a safety suit, a safety belt, boots, and/or a face mask. The one or more items of safety equipment may be identified from the video feed and/or IoT sensor set 125, similar to how the one or more objects are identified described above with respect to step 204. For example, the video feed may indicate the user is wearing a helmet and goggles. In another example, the item of safety equipment may be equipped with an eye movement sensor, which may indicate that the item is the goggles. It may be appreciated that the examples described above are not intended to be limiting, and that in embodiments of the present invention the video feed and IoT sensor set 125 may indicate different items of safety equipment being used by the user.

Then, at 208, the accident visualization program 150 assigns the compatibility score to the user. The compatibility score is assigned based on the identified one or more items of safety equipment. The compatibility score may be a measure of how well the user is equipped to perform an action in the multi-machine environment, described in further detail below with respect to step 210. The compatibility score may be, for example, a numerical score between "1" and "5," where "1" indicates the user is least equipped to perform the action and "5" indicates the user is most equipped to perform the action.

In particular, the compatibility score may be assigned based on the cumulative set of safety equipment used by the user. For example, depending on the type of activity, "Set 1" type safety equipment used by the user may grant a compatibility score of "1," "Set 2" type safety equipment used by the user may grant a compatibility score of "2," and so on, where "Set 2" includes a greater number of items of safety equipment than "Set 1." Continuing the example, where the type of activity is assembling objects in the manufacturing facility, "Set 1" may include a helmet, vest, and gloves, and "Set 5" may include a helmet, vest, gloves, boots, a safety suit, and goggles. Thus, more items of safety equipment used by the user may result in a higher compatibility score. The items of safety equipment included in "Set 1," "Set 2," "Set 3," "Set 4," and "Set 5" for the particular activity may be pre-determined by the user or another individual, such as a foreman or manager, in the multi-machine environment. It may be appreciated that the examples described above are not intended to be limiting, and that in embodiments of the present invention different items of safety equipment may be associated with different compatibility scores.

Next, at 210, the accident visualization program 150 determines whether the compatibility score is adequate to perform the predicted action of the user without the accident. The determination is made based on the historical data.

According to at least one embodiment, the predicted action of the user may be the mobility direction of the user. According to at least one other embodiment, the predicted action of the user may be the interaction of the user with the one or more objects. The user may be wearing AR goggles or an AR headset. Based on the viewing direction of the user, the accident visualization program 150 may predict the action of the user. For example, when the user is gazing at a machine 15 feet in front of the user, the predicted action may be that the user will interact with that machine. Furthermore, the distance between the object and the user may be used to predict that the user has to walk to a certain location to interact with that object. Continuing the example where the distance is 15 feet, the predicted action may also be the mobility direction of the user.

As described above with respect to step 202, the historical accidents and the one or more factors may be contained in a knowledge corpus, which may process this information and associate certain factors with particular historical accidents. Examples of the historical accident, as well as an accident during the real-time implementation of the accident visualization program 150 may include, but are not limited to, a slip, fall, cut, bruise, burn, breaking of a bone, and/or any other injury. It may be appreciated that in embodiments of the present invention, the historical accidents may be collected from the entire body of workers in the multi-machine environment. Thus, the historical accident may be associated with the user or another worker.

The one or more factors may include, but are not limited to, what safety equipment the user or worker had when the historical accident occurred, the context of the activity when the historical accident occurred, and/or the properties of the one or more objects when the historical accident occurred. For example, the historical accident may have occurred because the user or other worker did not have the proper items of safety equipment or because the user or other worker was not wearing the safety equipment appropriately. Continuing the example, the historical accident may be the worker getting cut by the cutting tool because the worker was not wearing gloves. In this example, the knowledge corpus may determine that the lack of gloves caused the worker to get cut. In another example, the historical accident may be the worker slipping and falling on oil because the worker was not wearing boots. In this example, the knowledge corpus may determine the lack of boots and the context of the activity (i.e., oil on the floor) caused the worker to slip and fall. Thus, the compatibility score of the user may be compared with the one or more factors that caused the historical accident to determine whether the compatibility score is adequate. Continuing the example where the worker slipped and fell on oil because the worker was not wearing boots, if the user in real-time is also not wearing boots and there is oil on the floor, the user may not have the required compatibility score to perform the action without the accident. Continuing the example, the user may have a compatibility score of "2," but the user may need a compatibility score of "3" or higher to have the adequate compatibility score. It may be appreciated that the examples described above are not intended to be limiting, and that in embodiments of the present invention different compatibility scores may be considered adequate and other factors may be determined to cause the historical accidents.

In response to determining the compatibility score is not adequate (step 210, "No" branch), the AR accidental situation visualization process 200 proceeds to step 212 to execute the digital twin simulation of the avatar of the user with the identified one or more items of safety equipment. In response to determining the compatibility score is adequate (step 210, "Yes" branch), the AR accidental situation visualization process 200 ends.

Then, at 212, the accident visualization program 150 executes the digital twin simulation of the avatar of the user with the identified one or more items of safety equipment. The digital twin simulation is executed based on the predicted action of the user and the historical data. The accident visualization program 150 may use known techniques to create the avatar of the user, and this avatar may be used in the digital twin simulation. The avatar used in the simulation may have the same specifications (e.g., weight and height) the user has in the real-world as well as the same items of safety equipment. For example, if the user in the real-world has a helmet and gloves, the avatar may also have the helmet and gloves. Additionally, the avatar may be wearing the one or more items of safety equipment in the same manner as the user in the real-world. For example, if the user in the real-world has gloves only partially covering their hand, the gloves may also only partially cover the hands of the avatar. In this manner, maximum accuracy may be preserved during the digital twin simulation. The avatar in the digital twin simulation may then perform the predicted action of the user. For example, when the user is gazing at a machine 15 feet in front of the user, the predicted action may be that the user will interact with that machine. Continuing the example, the avatar in the digital twin simulation may walk 15 feet and then interact with the machine. Where the historical data indicates that the historical accident occurred in the real-world, then the same accident may be simulated in the digital twin simulation. For example, if the historical accident is the worker slipping and falling on oil because the worker was not wearing boots, then when the digital twin simulation is executed, the avatar may also slip and fall on the oil. It may be appreciated that the examples described above are not intended to be limiting, and that in embodiments of the present invention the avatar may perform a different action and may have different items of safety equipment.

Next, at 214, the accident visualization program 150 creates the visual animation of the resultant state of the avatar of the user. The visual animation is created consistent with the executed digital twin simulation. Thus, the resultant state of the avatar may be what happened to the avatar in the digital twin simulation. For example, where the avatar slipped and fell on oil in the digital twin simulation, the slip and fall may be the resultant state of the avatar. In another example, where the avatar suffered a cut in the digital twin simulation, the cut may be the resultant state of the avatar. The created visual animation may be an AR representation of the resultant state of the avatar. The AR representation may be configured to be superimposed over the real-world environment when displayed to the user, described in further detail below with respect to step 216. According to at least one embodiment, the AR representation of the resultant state of the avatar may be a still image. According to at least one other embodiment, the AR representation of the resultant state of the avatar may be a video image.

Then, at 216, the accident visualization program 150 displays the visual animation to the user via the AR device.

The AR device may by the AR goggles or the AR headset. The AR goggles and the safety goggles may be a single device to provide eye protection to the user as well as to display the AR representation of the resultant state of the avatar. The AR representation may be superimposed over the real-world multi-machine environment, as described above with respect to step 214. The AR representation may be displayed directly in front of the viewing direction of the user, as determined by the eye movement sensor.

According to at least one embodiment, displaying the visual animation to the user may also include performing a preventive measure. The preventive measure may include displaying a boundary via the AR device as a digital image overlay in the multi-machine environment. The digital image overlay of the boundary may be a line or a circle which indicates a safe area (i.e., where no accident will result) for the user to perform the predicted action. Thus, the digital image overlay of the boundary may display a safe movement path for the user. For example, the digital image overlay of the boundary may indicate that the user should not take a step past the line. Also, the digital image overlay of the boundary may display which of the one or more objects, including one or more machines, is safe for the user to interact with. For example, an object within the circle may be safe for the user to interact with.

According to at least one other embodiment, the preventive measure may also include assigning the activity to a machine within the displayed boundary. The activity may be assigned to the machine within the displayed boundary in response to the user selecting the resultant state of the avatar. The AR representation may be configured to be selected by the user. For example, the user may point to or tap on the avatar. When pointing to or tapping on the avatar, the accident visualization program 150 may reassign the activity from a machine outside the displayed boundary to a different machine within the displayed boundary.

Next, at 218, the accident visualization program 150 identifies the required compatibility score for the user to perform the predicted action without the accident. The required compatibility score is identified based on the historical data. For example, the user may have a compatibility score of "2," but the user may need a compatibility score of "3" or higher to have the adequate compatibility score. Continuing the example, where the type of activity is assembling objects in the manufacturing facility and the historical accident is slipping and falling on oil, "Set 2" may include a helmet, vest, and gloves, and "Set 3" may include a helmet, vest, gloves, and boots. Since the boots may provide more traction for the user, the boots may be required in lieu of or in addition to the items of safety equipment in "Set 2." It may be appreciated that the examples described above are not intended to be limiting, and that in embodiments of the present invention different compatibility scores may be the required compatibility score.

Then, at 220, the accident visualization program 150 recommends the one or more updates to the one or more items of safety equipment used by the user. The one or more updates are recommended based on the required compatibility score. As described above with respect to step 216, the AR representation of the resultant state of the avatar of the user may be configured to be selected by the user. According to at least one embodiment, when the user points to or taps on the avatar, the accident visualization program 150 may recommend the one or more updates via the AR device.

Examples of the recommended update include, but are not limited to, an additional item of safety equipment and/or a modification to the item of safety equipment. For example, when the required compatibility score is "3" or higher and the user has a compatibility score of "2," the additional item of safety equipment may be a piece of safety equipment in "Set 3" that is not included in "Set 2." Continuing the example, where the type of activity is assembling objects in the manufacturing facility and the historical accident is slipping and falling on oil, "Set 2" may include a helmet, vest, and gloves, and "Set 3" may include a helmet, vest, gloves, and boots. Since the boots may provide more traction for the user, the boots may be the additional item of safety equipment recommended. Alternatively, the user may not be wearing the item of safety equipment properly. For example, the user may not be wearing the safety belt properly. In this example, the recommended update may be a modification to the safety belt. The modification may be a tightening of the safety belt, and the AR device may display to the user a visual of how to tighten the safety belt. It may be appreciated that the examples described above are not intended to be limiting, and that in embodiments of the present invention the additional item of safety equipment and the modifications to the item of safety equipment may vary.

Figure 3:
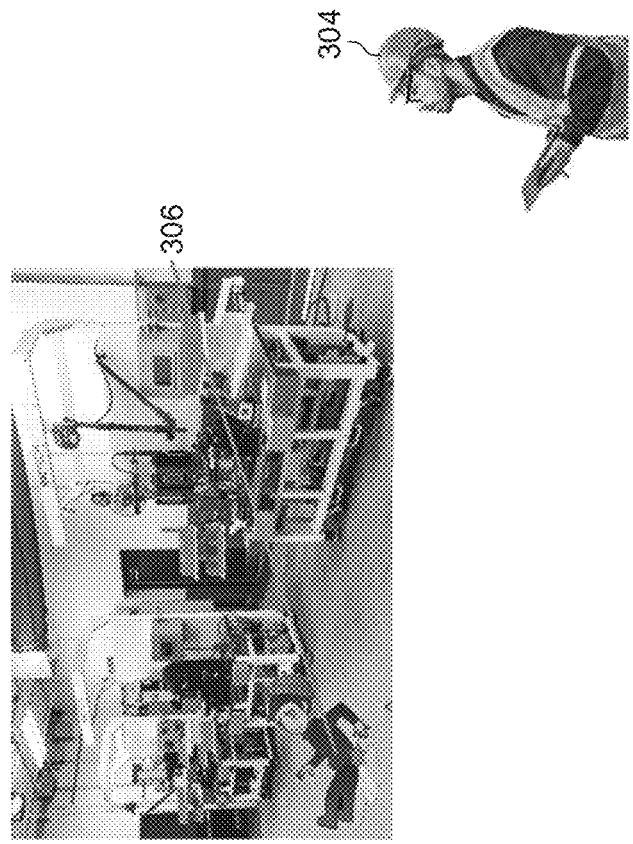
FIG. 3 is a diagram depicting an operational example of how an accidental situation is displayed to a user via an AR device according to at least one embodiment.
Figure 3:
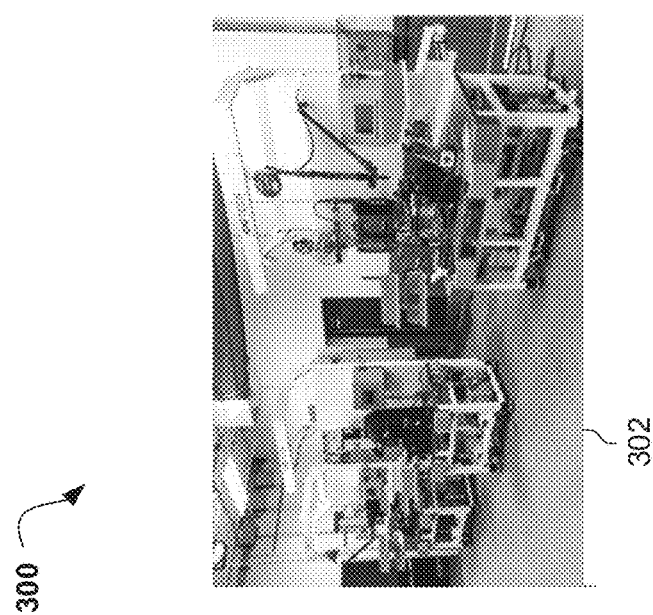

Referring now to FIG. 3, a diagram 300 depicting an operational example of how an accidental situation is displayed to a user via the AR device is shown according to at least one embodiment. In the diagram 300, the multi-machine environment 302 may include a plurality of objects, including but not limited to one or more machines. The user 304 may be wearing the AR device, such as the AR goggles or the AR headset. The user 304, while wearing the AR device, may be gazing at a particular object in the multi-machine environment 302. Based on the predicted action of the user 304, the AR representation 306 may be displayed directly in front of the viewing direction of the user 304. For example, the AR representation 306 displayed may show the user 304 slipping and falling on a slippery substance on the floor of the multi-machine environment 302. The user 304 may then point to or tap on the AR representation 306 to be presented with the recommended one or more updates.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of augmented reality (AR)-based visualization of an accidental situation in a multi-machine environment, the method comprising:
   receiving real-time and historical data relating to an activity in a multi-machine environment;
   identifying a context of the activity and at least one property of one or more objects associated with the activity based on the real-time data;

identifying one or more items of safety equipment used by a user in the multi-machine environment;

assigning a compatibility score to the user based on the identified one or more items of safety equipment;

determining whether the compatibility score is adequate to perform a predicted action of the user without an accident based on the historical data;

in response to determining the compatibility score is not adequate, executing a digital twin simulation of an avatar of the user having the identified one or more items of safety equipment based on the predicted action of the user and the historical data, wherein the avatar of the user is wearing the identified one or more items of safety equipment in a same manner as the user in the multi-machine environment, and wherein the digital twin simulation is executed based on determining the user is within a pre-defined distance of at least one machine in the multi-machine environment;

creating a visual animation of a resultant state of the avatar of the user consistent with the executed digital twin simulation; and displaying the visual animation to the user via an AR device.

2. The computer-based method of claim 1, wherein displaying the visual animation to the user via the AR device further comprises:

performing a preventive measure.

3. The computer-based method of claim 2, wherein the preventive measure includes displaying a boundary via the AR device as a digital image overlay in the multi-machine environment, wherein the boundary indicates a safe area for the user to perform the predicted action.

4. The computer-based method of claim 3, wherein the preventive measure includes assigning the activity to a machine within the displayed boundary in response to the user selecting the resultant state of the avatar.

5. The computer-based method of claim 1, further comprising:

identifying a required compatibility score for the user to perform the predicted action without the accident based on the historical data.

6. The computer-based method of claim 5, further comprising:

recommending one or more updates to the one or more items of safety equipment used by the user based on the required compatibility score.

7. The computer-based method of claim 6, wherein the recommended update is selected from a group consisting of an additional item of safety equipment and a modification to the item of safety equipment.

8. A computer system, the computer system comprising: one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving real-time and historical data relating to an activity in a multi-machine environment;

identifying a context of the activity and at least one property of one or more objects associated with the activity based on the real-time data;

identifying one or more items of safety equipment used by a user in the multi-machine environment;

assigning a compatibility score to the user based on the identified one or more items of safety equipment;

determining whether the compatibility score is adequate to perform a predicted action of the user without an accident based on the historical data;

in response to determining the compatibility score is not adequate, executing a digital twin simulation of an avatar of the user having the identified one or more items of safety equipment based on the predicted action of the user and the historical data, wherein the avatar of the user is wearing the identified one or more items of safety equipment in a same manner as the user in the multi-machine environment, and wherein the digital twin simulation is executed based on determining the user is within a pre-defined distance of at least one machine in the multi-machine environment;

creating a visual animation of a resultant state of the avatar of the user consistent with the executed digital twin simulation; and displaying the visual animation to the user via an AR device.

9. The computer system of claim 8, wherein displaying the visual animation to the user via the AR device further comprises:

performing a preventive measure.

10. The computer system of claim 9, wherein the preventive measure includes displaying a boundary via the AR device as a digital image overlay in the multi-machine environment, wherein the boundary indicates a safe area for the user to perform the predicted action.

11. The computer system of claim 10, wherein the preventive measure includes assigning the activity to a machine within the displayed boundary in response to the user selecting the resultant state of the avatar.

12. The computer system of claim 8, further comprising:

identifying a required compatibility score for the user to perform the predicted action without the accident based on the historical data.

13. The computer system of claim 12, further comprising:

recommending one or more updates to the one or more items of safety equipment used by the user based on the required compatibility score.

14. The computer system of claim 13, wherein the recommended update is selected from a group consisting of an additional item of safety equipment and a modification to the item of safety equipment.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving real-time and historical data relating to an activity in a multi-machine environment;

identifying a context of the activity and at least one property of one or more objects associated with the activity based on the real-time data;

identifying one or more items of safety equipment used by a user in the multi-machine environment;

assigning a compatibility score to the user based on the identified one or more items of safety equipment;

determining whether the compatibility score is adequate to perform a predicted action of the user without an accident based on the historical data;

in response to determining the compatibility score is not adequate, executing a digital twin simulation of an avatar of the user having the identified one or more items of safety equipment based on the predicted action of the user and the historical data, wherein the avatar of the user is wearing the identified one or more items of safety equipment in a same manner as the user in the multi-machine environment, and wherein the digital twin simulation is executed based on determining the user is within a pre-defined distance of at least one machine in the multi-machine environment;

creating a visual animation of a resultant state of the avatar of the user consistent with the executed digital twin simulation; and displaying the visual animation to the user via an AR device.

16. The computer program product of claim 15, wherein displaying the visual animation to the user via the AR device further comprises:

performing a preventive measure.

17. The computer program product of claim 16, wherein the preventive measure includes displaying a boundary via the AR device as a digital image overlay in the multi-machine environment, wherein the boundary indicates a safe area for the user to perform the predicted action.

18. The computer program product of claim 17, wherein the preventive measure includes assigning the activity to a machine within the displayed boundary in response to the user selecting the resultant state of the avatar.

19. The computer program product of claim 15, further comprising:

identifying a required compatibility score for the user to perform the predicted action without the accident based on the historical data.

20. The computer program product of claim 19, further comprising:

recommending one or more updates to the one or more items of safety equipment used by the user based on the required compatibility score.

* * * * *